Aug. 15, 1950 N. I. KONWAL 2,518,907
MECHANICAL WATER DEPTH INDICATOR
Filed Feb. 14, 1949

INVENTOR.
Nick Ignatius Konwal
BY

Patented Aug. 15, 1950

2,518,907

UNITED STATES PATENT OFFICE 2,518,907

MECHANICAL WATER DEPTH INDICATOR

Nick Ignatius Konwal, Cicero, Ill.

Application February 14, 1949, Serial No. 76,357

2 Claims. (Cl. 33—126.5)

This invention has to do with a mechanical means of checking the depth of water at slow to moderate speeds with the use of a boat.

The principal purpose of the invention is to provide an efficient and economical means of checking the depth of water while the boat is in motion.

The invention will be best understood by reference to the accompanying drawings showing the preferred form of construction, and in which.

Figure 1:
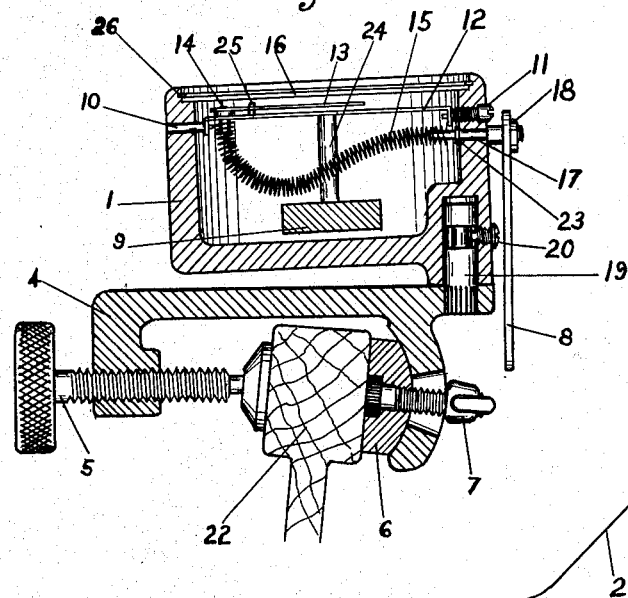
Fig. 1 is a longitudinal section through the indicator and clamp.
Figure 3:
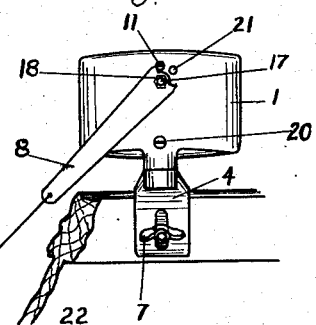
Fig. 3 is a diminished view of the water depth indicator showing an application to a boat with line and weight.

Referring to the drawing 1 designates the body housing the indicator and in this connection 4 is a C type of clamp with a movable anvil 6 which is adjusted to conform with the angle of the boat 22 and locked with nut 7 keeping the top of clamp 4 horizontal to the water and secured to the boat by tightening with the wheel 5 comprising a wheel, a screw with swivel end and a disc.

At the bottom of the water the weight 3 is dragged by the line 2 of suitable material and of a specified length in accordance with the calibration of the indicator dial 12. The line 2 is connected to operating lever 8 which is restricted to 90 degrees of movement by the stop pin 21. Lever 8 is secured to shaft 17 by means of lock nut 18. The shaft is kept in position of body 1 by a groove and lock ring 23 on the inside relative to body 1 and connected to shaft 17 is a flexible shaft 15 of a flat wire spring type which transmits the motion of the operating lever 8 through the bearing 14 to indicator pointer 13.

In regard to the pitch of the boat fore and aft, the indicator is kept accurate and horizontal to the water line by gravity by the weight 9 secured to the dial 12 by the two pins 24; this dial swivels on the small end of pin 10 and the shoulder screw with turned end 11. Covering the indicator is a transparent top 16 kept in place by a ring 26.

The dial 12 and body 1 is kept perpendicular to the line and weight by swiveling on pin 19 which is inserted and secured to clamp 4. The body 1 is held in place on pin 19 by the shoulder screw 20 in the neck portion of pin 19.

Figure 2:
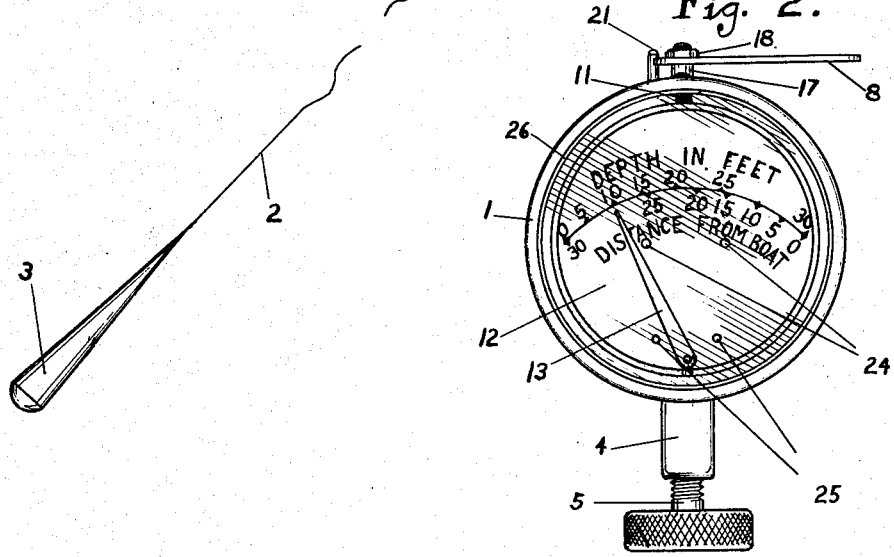
Fig. 2 is a top view of the indicator.

Fig. 2 also shows the two readings of the dial, depth and distance, which may be any specified, but in this particular drawing showing a calibration for a 30 foot line. The pointer 13 is provided with two stop pins 25.

My water depth indicator is easy to operate and may be made of any suitable material. Being simple in construction it may be manufactured at an economical cost.

While I have illustrated and described the preferred form of construction for carrying my invention into effect, this is capable of variation and modification without departing from the spirit of the invention. I therefore do not wish to be limited to the precise details of construction set forth, but desire to avail myself of such variation and modification as come within the scope of the appended claims.

Having thus described my invention, what I claim as new and desire to protect by Letters Patent is:

1. A water depth gauging device of the class described comprising a housing provided with a transparent top, said housing having two pins each extending inwardly and diametrically opposite and near the top of said housing, an indicator enclosed in said housing and pivotally suspended on said two pins and having a pointer and a dial, a flexible shaft connected at one end to said pointer through a bearing in said indicator, an operating shaft connected to the opposite end of said flexible shaft, a weight fastened to said indicator at a point substantially lower than said pins, said operating shaft extending through one side of said housing and parallel to said pins, a lever having one end fastened to said operating shaft, a fixed length of line connected at one end to the opposite end of said lever, a weight attached to the opposite end of said line, the dial of said indicator being calibrated to show depth in feet of said weight connected to said fixed length of line while in operation.

2. A water depth gauging device of the class described comprising a housing provided with a transparent top, said housing having two pins each extending inwardly and diametrically opposite and near the top of said housing, an indicator enclosed in said housing and pivotally suspended on said two pins and having a pointer and a dial, a flexible shaft connected at one end to said pointer through a bearing in said indicator, an operating shaft connected to the opposite end of said flexible shaft, a weight fastened to said indicator at a point substantially lower than said pins, said operating shaft extending through one side of said housing and parallel to said pins, a lever having one end fastened to said operating shaft, a fixed length of line connected at one end to the opposite end of said lever, a weight attached to the opposite end of said line, a C type screw clamp having a movable anvil, said movable anvil being provided with a screw and clamping nut, a pin secured to said clamp and having a necked portion, said housing having a bore to receive said pin to provide a swivel, a screw in said housing engaging the necked portion of said pin, the dial of said indicator being calibrated to show depth in feet of said weight connected to said fixed length of line while in operation.

NICK IGNATIUS KONWAL.

REFERENCES CITED

The following references are of record in the file of this patent:

FOREIGN PATENTS

| Number | Country | Date |
|--------|---------|------|
| 2,229 | Great Britain | Oct. 18, 1854 |
| 2,351 | Great Britain | Dec. 29, 1874 |
| 3,823 | Great Britain | Nov. 22, 1873 |